(12) United States Patent
Pommer

(10) Patent No.: US 7,716,844 B2
(45) Date of Patent: May 18, 2010

(54) MEASURING SYSTEM FOR MEASURING THE TOOTH GEOMETRY OF A GEAR WHEEL

(75) Inventor: Andreas Pommer, Altdorf (DE)

(73) Assignee: Frenco GmbH, Altdorf (DE)

( * ) Notice: Subject to any disclaimer, the term of this patent is extended or adjusted under 35 U.S.C. 154(b) by 0 days.

(21) Appl. No.: 11/792,388

(22) PCT Filed: Dec. 2, 2005

(86) PCT No.: PCT/EP2005/012873

§ 371 (c)(1),
(2), (4) Date: Jun. 6, 2007

(87) PCT Pub. No.: WO2006/061145

PCT Pub. Date: Jun. 15, 2006

(65) Prior Publication Data

US 2008/0083126 A1    Apr. 10, 2008

(30) Foreign Application Priority Data

Dec. 6, 2004    (DE) ........................ 10 2004 058 657

(51) Int. Cl.
*G01B 5/20* (2006.01)
*G01B 21/20* (2006.01)
(52) U.S. Cl. ............... 33/501.19; 33/501.14; 33/501.17
(58) Field of Classification Search ............... 33/501.14, 33/501.7, 501.9, 501.17, 501.18, 501.19
See application file for complete search history.

(56) References Cited

U.S. PATENT DOCUMENTS

| 2,697,283 | A | * | 12/1954 | Leuthold | 33/501.14 |
|---|---|---|---|---|---|
| 2,780,007 | A | | 2/1957 | Pomernacki | |
| 3,044,176 | A | * | 7/1962 | Richmond et al. | 33/501.19 |
| 3,877,150 | A | * | 4/1975 | Hofler | 33/501.14 |
| 3,921,304 | A | * | 11/1975 | Yagiela | 33/501.19 |
| 4,062,125 | A | * | 12/1977 | Maag | 33/501.14 |
| 4,128,945 | A | * | 12/1978 | Barritt | 33/501.14 |
| 4,325,189 | A | * | 4/1982 | Fransson et al. | 33/501.19 |
| 4,337,580 | A | * | 7/1982 | Tanno et al. | 33/501.9 |
| 4,457,074 | A | * | 7/1984 | Golder | 33/501.9 |
| 4,498,335 | A | * | 2/1985 | Thoma | 33/501.9 |
| 4,519,141 | A | * | 5/1985 | Meder et al. | 33/501.9 |
| 4,519,242 | A | * | 5/1985 | Hofler et al. | 33/501.9 |
| 4,520,700 | A | * | 6/1985 | Herzog et al. | 33/501.14 |

(Continued)

FOREIGN PATENT DOCUMENTS

DE    195 19 429 C1    10/1996

(Continued)

OTHER PUBLICATIONS

"Rollscan, Measurement of total gear geometry", FRENCO GmbH.

(Continued)

*Primary Examiner*—Yaritza Guadalupe-McCall
(74) *Attorney, Agent, or Firm*—Sughrue Mion, PLLC

(57) ABSTRACT

The invention relates to a measuring system for measuring the tooth dimensions of a gear wheel, particularly of a spur gear or bevel gear. According to the invention, at least one feeler is mounted on a pivotally or rotationally mounted supporting body and, during the measuring process rests, against the tooth flank to be measured.

6 Claims, 5 Drawing Sheets

U.S. PATENT DOCUMENTS

Figure 1:
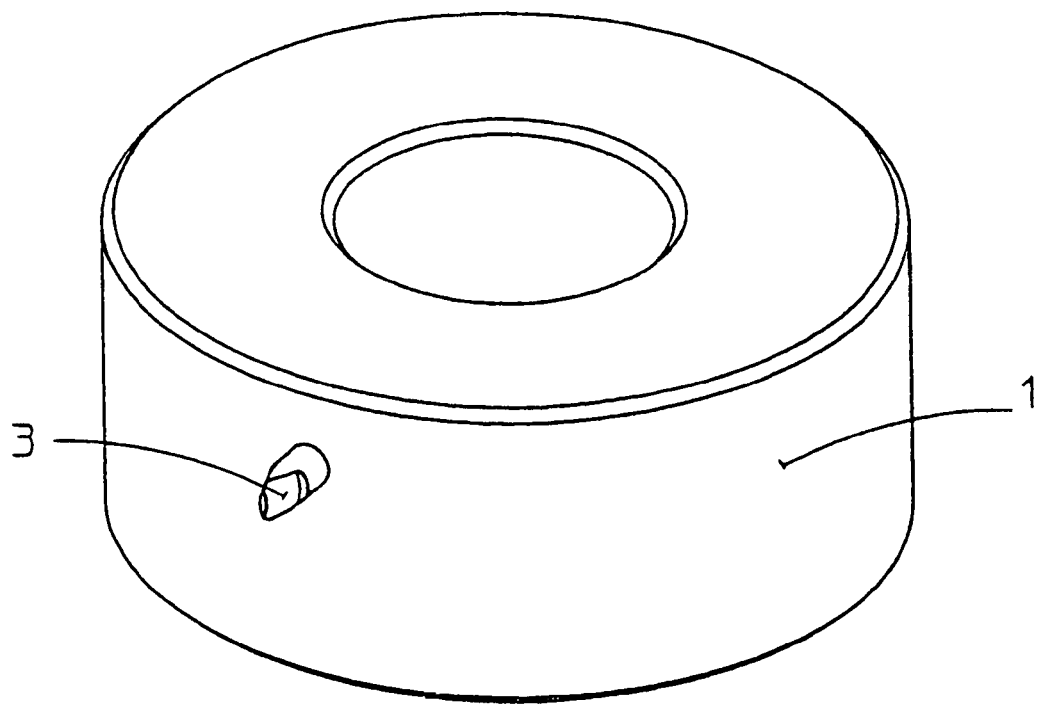

| | | | | |
|---|---|---|---|---|
| 4,550,508 A | * | 11/1985 | Spaeth | 33/501.19 |
| 4,811,490 A | * | 3/1989 | Ueda et al. | 33/501.14 |
| 4,962,590 A | * | 10/1990 | Ambrose | 33/501.14 |
| 5,016,471 A | * | 5/1991 | Och | 33/501.19 |
| 5,231,875 A | * | 8/1993 | Honda | 33/501.7 |
| 5,271,271 A | * | 12/1993 | Frazier | 33/501.19 |
| 5,392,644 A | * | 2/1995 | Frazier | 33/501.19 |
| 5,396,711 A | * | 3/1995 | Iwasaki et al. | 33/501.14 |

FOREIGN PATENT DOCUMENTS

| | | |
|---|---|---|
| EP | 0 131 537 A1 | 1/1985 |
| GB | 1 472 628 A | 5/1977 |

OTHER PUBLICATIONS

S.L. Arsenjev, "To the Strength First Problem Full Solution: Mechanics of a Necking.", Physical Technical Group, p. 1-5, Ukraine.

\* cited by examiner

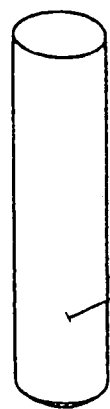 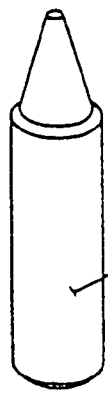 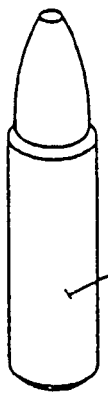 
Fig. 3　　Fig. 4　　Fig. 5　　Fig. 6
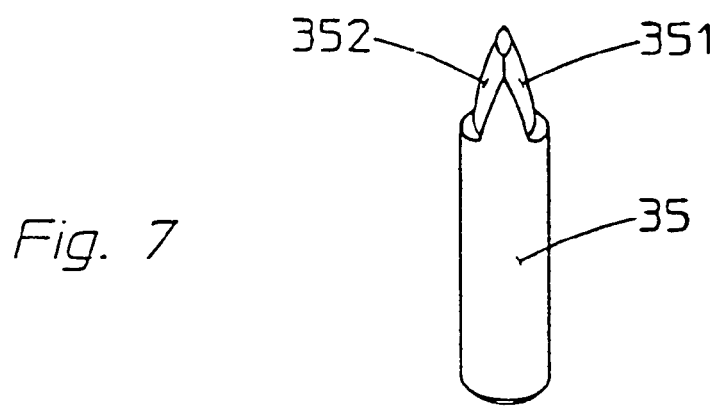
Fig. 7
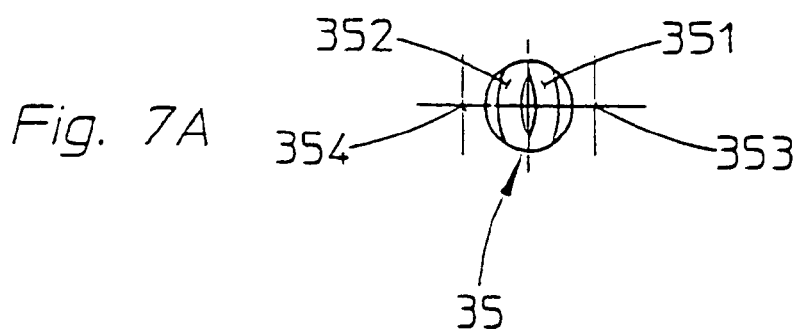
Fig. 7A

MEASURING SYSTEM FOR MEASURING THE TOOTH GEOMETRY OF A GEAR WHEEL

The invention relates to a measuring system for measuring the tooth geometry of a gearwheel (test piece), particularly of a spur gearwheel or bevel gearwheel.

A measuring system of the kind designated above is known from DE-PS 195 19 429 (Ford), in which the test piece comes into contact with a master gearwheel (roll master). In this connection, for example, the roll master is co-rotated by the driven test piece. If the quotient of the rotational speeds of test piece and roll master exhibits departures from the desired value then this is an indication of deviations of the tooth flank of the test piece from the desired value. In order, however, to be able to be able to clearly associate non-conforming measuring points of a measuring sequence, and thus the deviation of a tooth flank from the desired value, with a specific tooth flank of the test piece the teeth of the roll master are arranged at least twice the pitch of the test piece so that always the next-but-one tooth of the test piece is measured. In order to measure all teeth of the test piece several measuring processes are therefore necessary.

The known measuring system thus has the following disadvantages:

Test piece and roll master have to have the same base pitch diameter and the same angle of inclination. This means that appropriate roll masters with different pitch always have to be present and wear at the roll master usually leads to failure thereof. Since, moreover, several measuring processes are necessary for each test piece the time required for this purpose is considerable.

A measuring system for double-flank rolling-contact testing with two rotating wheels is described in U.S. Pat. No. 2,780,007 (Pomernacki). The system consists of a roll master with strictly involute flanks and the test piece. However, complete master gearwheels are no longer used, but only tooth segments of these wheels, which, however, are always part of a strictly involute basic geometry. The contact between the roll master and the test piece is always a short lineal contact. For this reason this measuring system can, by virtue of the reduced tooth contact, be regarded as an extension of the double-flank rolling-contact testing, which leads away from summated error checking and approaches individual error checking. However, this known system is subject to the disadvantage that the roll master has to be specifically appropriate to the respective test piece with respect to profile shape, pitch and angle of inclination.

The invention therefore has the object of creating a measuring system which avoids the afore-described disadvantages.

According to the invention this task is fulfilled in that the measuring system is also designed in accordance with the characterising part of claim 1.

Developments and refinements of claim 1 are claimed in the subclaims.

Figure 2:
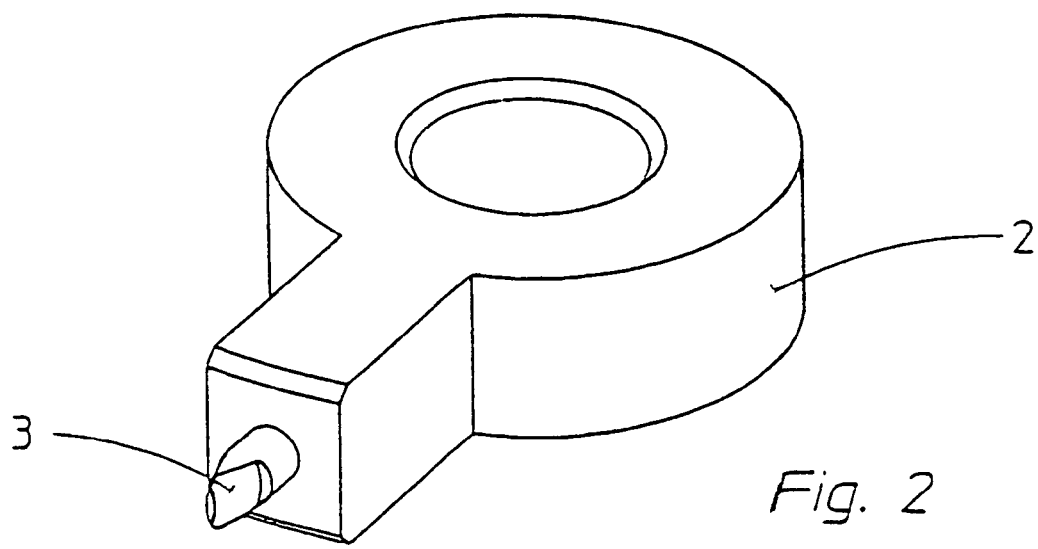
Figure 8A:
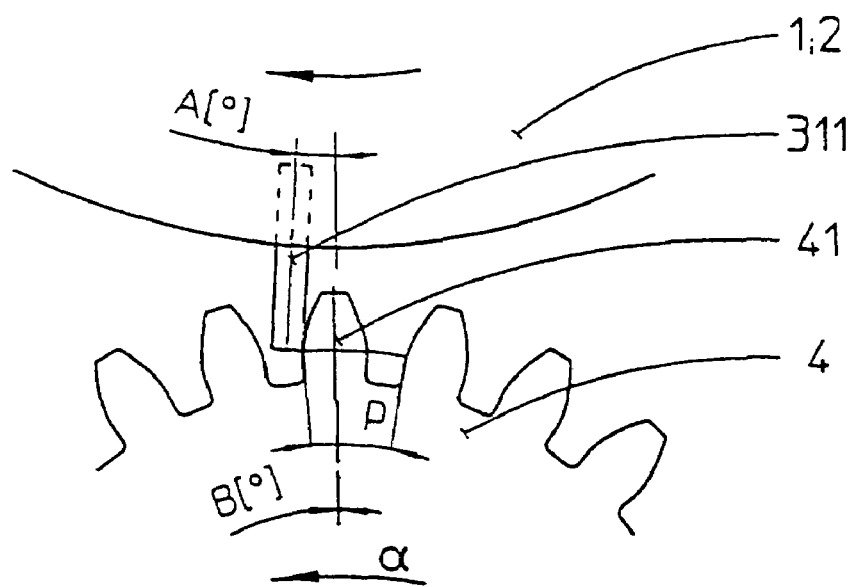
Figure 8B:
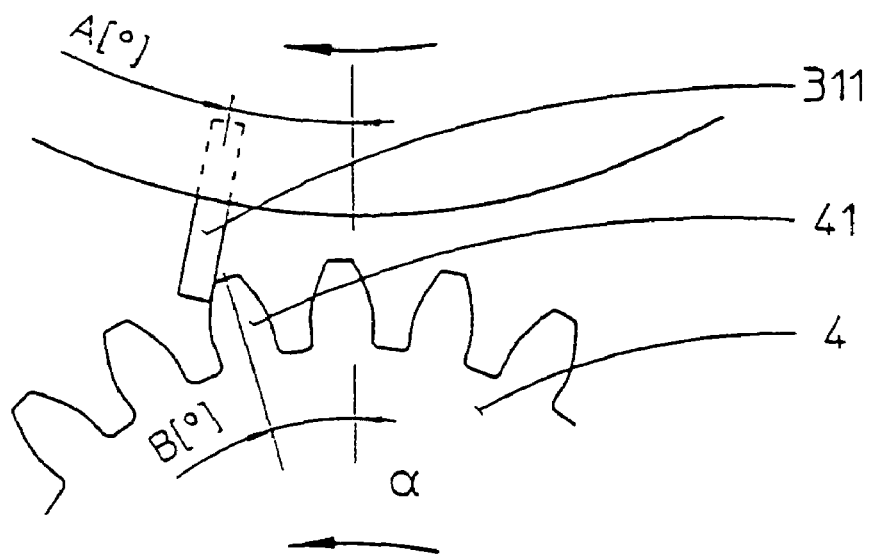
Figure 9A:
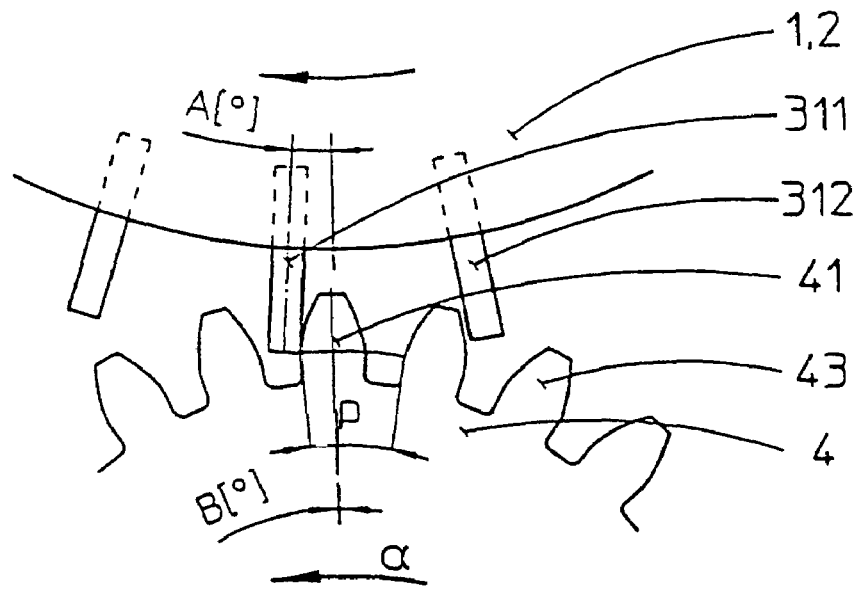
Figure 9B:
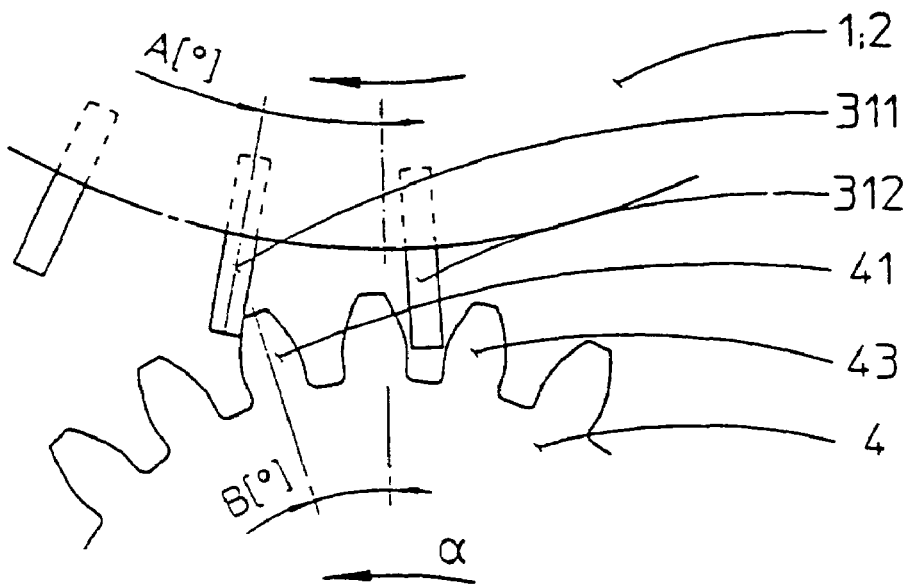
Figure 10:
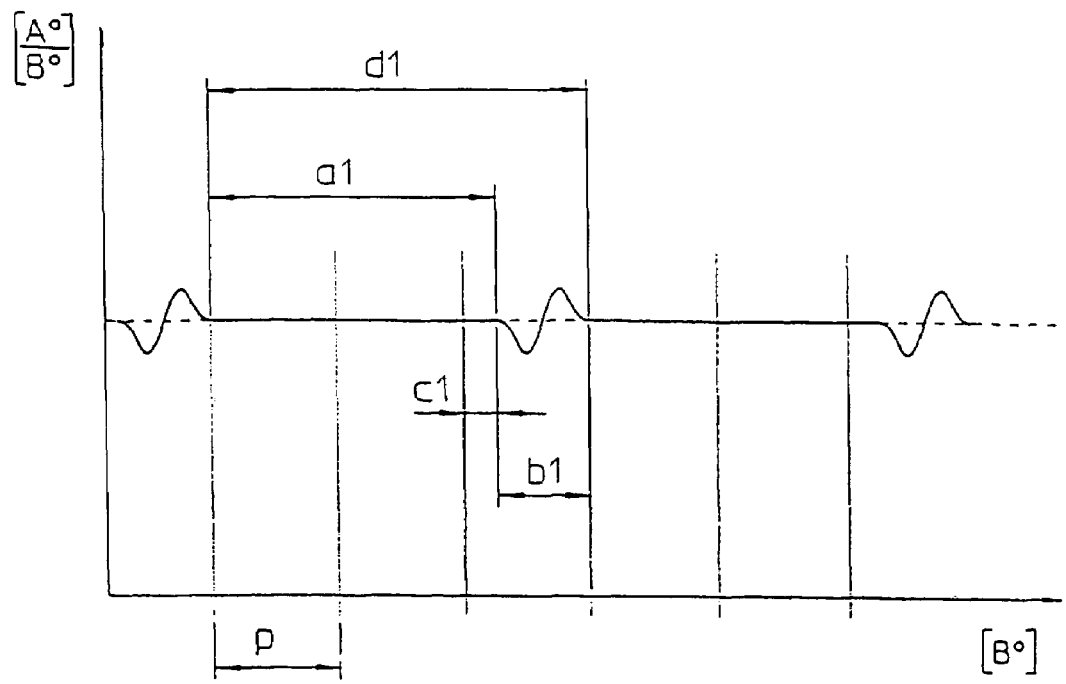
Figure 11:
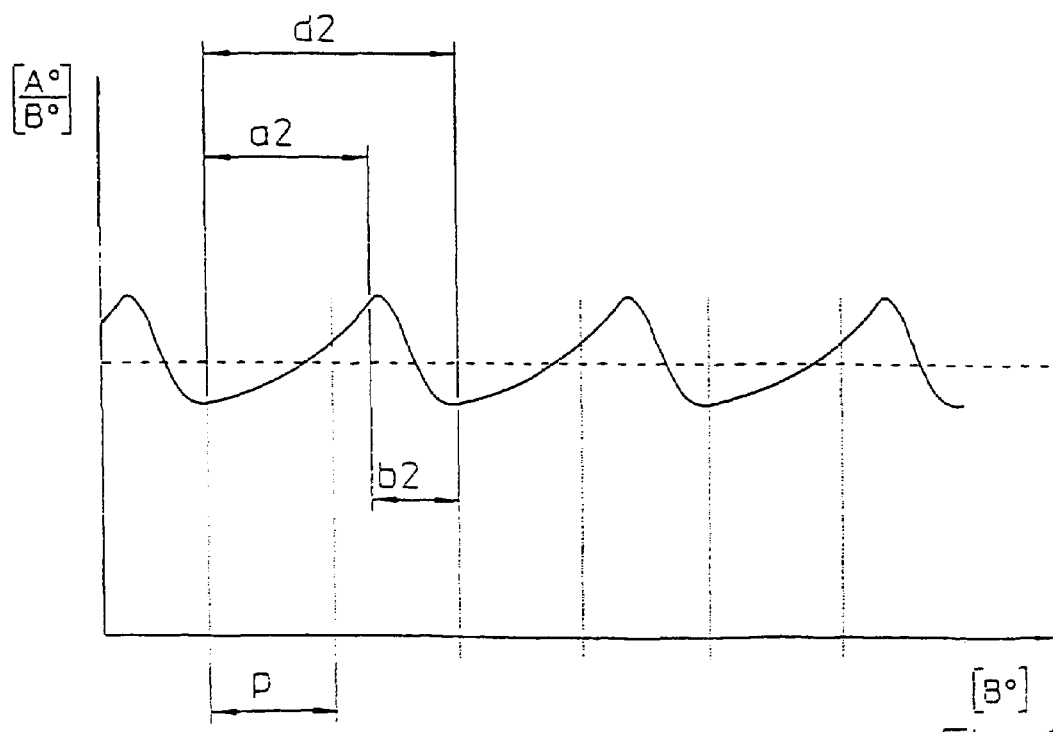

Examples of embodiment of the invention are reproduced in the drawings, in which:

FIG. 1 shows a pivotably or rotatably mounted carrier wheel, at which a scanning pin is mounted, and FIG. 2 shows a pivotably or rotatably mounted carrier arm, at which a scanning pin is mounted;

Six different forms of scanning pins are reproduced in the following FIGS. 3 to 7 and, in particular, in the form of:

FIG. 3 a circular cylinder,
FIG. 4 a circular cone,
FIG. 5 a circular evolventoid,
FIG. 6 a circular curve sector,
FIG. 7 shows a scanning pin formed by the surface sections of two surfaces which arise through rotation of a contour element about two eccentrically disposed axes of rotation,
FIG. 7A shows a view of the scanning pin from the direction of the arrow VII A of FIG. 7,
FIG. 8A shows test piece and scanning pin at the beginning of a measuring path,
FIG. 8B shows test piece and scanning pin at the end of a measuring path,
FIG. 9A shows test piece and scanning pin at the beginning of a measuring path with a carrier wheel with several scanning pins,
FIG. 9B shows as for FIG. 9A, but at the end of a first measuring path and at the beginning of the next measuring path;

The graphical illustrations in FIGS. 10 and 11 shows the quotients of the rotational angle of test piece and scanning pin as a function of the rotational angle of the test piece with the scanning pin in the form of:

FIG. 10 a circular evolventoid and
FIG. 11 a circular cylinder.

The measuring system for measuring the tooth geometry of spur or bevel wheels 4 with straight or inclined toothing consists of a pivotably or rotatably mounted carrier body 1, 2, at which is mounted a scanning pin 3 which, during the measuring process, bears against the tooth flank to be measured. The scanning pin 3 is exchangeably mounted at the carrier wheel 1 or carrier arm 2.

The scanning pin 3 can have different forms and, in particular, that of a circular cylinder 31 according to FIG. 3, a circular cone 32 according to FIG. 4, a circular evolventoid 33 according to FIG. 5 and a circular arc 34 according to FIG. 6. In FIG. 7 there is reproduced a scanning pin 35, the form of which is formed by two surface sections 351, 352 which are created by rotation of a contour element, for example a triangle, about two eccentrically disposed axes 353, 354 of rotation.

The setting of a cylindrical scanning pin 311 at the tooth 41 of a gearwheel 4 (test piece) at the start of a measuring path is reproduced in FIG. 8A. For the measuring process the gearwheel 4 rotates in counter-clockwise sense in correspondence with the arrow α. The gearwheel 4 is the driving part in the measuring process in the example of FIG. 8A. However, the driving part can also be the scanning pin 311. FIG. 8B shows the end of the measuring process, in which the common point of contact has reached the upper edge of the gearwheel 41. During the measuring process the scanning pin 311 has rolling contact with the counter flank of the test piece 4 and in that case, between the two settings of FIGS. 8A, 8B, is in tangential point contact therewith. It is thereby possible to assign measuring points to unique locations on the counter flank. The measuring points are obtained by continuous evaluation of the angular settings of the axes of rotation of test piece 4 and the carrier body 1, 2 of the scanning pin 3.

An involute scanning pin 3 moves with rolling contact on the tooth flank of a test piece 4 with continuous translation. In the ideal case the quotient i of the two rotational angles is therefore constant during the rolling process. Deviations of the flank shape in the test piece 4 lead to a deviation of the translation and thus of the quotient i, which can be evaluated. At the end of the tooth flank, as is reproduced in FIG. 8B for a cylindrical scanning pin 311, the scanning pin 311 loses contact with the tooth 41 of the test piece 4 and the movement b1, b2 (FIGS. 10, 11) is discontinuous. If several scanning pins 311, 312 are used in short succession, as is illustrated in FIGS. 9A, 9B, then the next measuring region begins with a short interruption. Otherwise, controlled or regulated axes are necessary in order to reach further teeth of the test piece 4.

A non-involute scanning pin, for example the scanning pin 31, 311, does indeed constantly move with rolling contact, but with discontinuous translation, on the flank of a spur wheel. The ideal translation according to FIG. 10 can be calculated from the geometry of the scanning pin and the test piece. Deviations of the measured translation from the pre-calculated ideal plot can be evaluated so that conclusions can be drawn about the deviations of the test piece. The duration of the rolling contact is different for geometrically different scanning pins. Cylindrical scanning pins run through the tooth flank of a test piece, but within a shorter angle A° (FIGS. 8A, 8B) than involute scanning pins 33. Accordingly, in the case of a carrier body 1, 2 with several scanning pins 311, 312, as is illustrated in FIGS. 9A, 9B, the sequence of non-involute scanning pins can be selected to be tighter than in the case of involute scanning pins, so that checking of all teeth of a test piece can be concluded with less measuring revolutions. In that case the scanning pin may be contacted always by only one scanning pin, since otherwise the location of a deviation on a tooth flank is not uniquely identifiable.

The rolling contact process with an involute scanning pin 33 is graphically illustrated in FIG. 10. The rotational angle B° of the test piece 4 during the test sequence is recorded on the abscissa and the quotient of the rotational angle A° of scanning pin 3 and the rotational angle B° of the test piece 4 is recorded on the ordinate. If the flank shape of the tested tooth corresponds with an ideal theoretical involute, then the test path a1 is a straight line extending parallel to the abscissa. A transport path b1 adjoins the first test path a1. The scanning pin 33 reaches the fourth tooth at the earliest at the end of the transport path b1. The pitch p of the test piece 4 signifies this in that the test path extends out by a small overlap amount c1 over the next tooth. The overlap is greater than two. The minimum scanning pin spacing d1 is thereby fixed.

The same rolling contact process, but with a cylindrical scanning pin 31, 311, is illustrated in FIG. 11. With a scanning pin of that kind the overlap is smaller than two, so that the scanning pins can stand more densely on the carrier body 1, 2 than is possible in the case of the afore-described evolventoid scanning pin 33. The minimum scanning pin spacing d2 is in this case significantly less.

The afore-described different scanning pin shapes 31 to 35 are required for the following two reasons:

A first reason is that through the selection of a suitable pin shape, not only the duration, but also the kinematic sequence of engagement of test piece 4 and scanning pin 3 can be influenced. This is an important criterion for the design of the sequence of the pins 311, 312 (FIGS. 9A, 9B) in the carrier body 1, 2. Moreover, the curvature of the pin surface influences the loading of the test piece 4 by the measuring process, which has to be taken into consideration in the case of non-hardened sensitive test pieces 4, because it is necessary to prevent scratching of the flank surfaces of the test piece 4 by the tips of the scanning pins. A further reason is that in the case of production of the scanning pins 3 from materials with highest wear resistance the selection of a simple pin shape can be required for economic and/or technical reasons, since scanning pins 33 with involute contours can be produced only with a very much greater cost than scanning pins 31 to 34 with circularly cylindrical contours.

REFERENCE NUMERAL LIST 1 carrier wheel
2 carrier arm
3 scanning pin
31 circular cylinder scanning pin
311 circular cylinder scanning pin
312 circular cylinder scanning pin
32 circular cone scanning pin
33 circular evolventoid scanning pin
34 circular curve sector scanning pin
35 surface sections of scanning pin
351 surface section
352 surface section
353 axis of rotation
354 axis of rotation
4 test piece
41 tooth
A° rotational angle of the scanning pin
B° rotational angle of the test piece
a test path
a1 first test path
a2 first test path
b1 first transport path
b2 first transport path
c overlap amount
d1 minimum scanning pin spacing
d2 minimum scanning pin spacing
p pitch
α rotational direction arrow

The invention claimed is:

1. A measuring system for measuring a tooth geometry of gearwheel toothing of a gearwheel defining a first axis of rotation, the system comprising
a carrier body defining a second axis of rotation,
a drive for rotational movement of the carrier body about said second axis
and a plurality of scanning pins arranged on the carrier body to each be brought by rotational movement into rolling contact with a flank of a tooth of the gearwheel toothing to be measured so as to continuously detect single measuring points on the flank of said tooth without lineal contact, and only with point contact, the scanning pins being arranged on the carrier body in succession with unequal pitch.

2. A measuring system according to claim 1, wherein at least one of the scanning pins has the contours of a circular cylinder.

3. A measuring system according to claim 1, wherein at least one of the scanning pins has the contours of a circular evolventoid.

4. A measuring system according to claim 1, wherein at least one of the scanning pins has the contours of a circular curve sector.

5. A measuring system according to claim 1, wherein at least one of the scanning pins has a shape formed by two surface sections of two surfaces created by rotation of a contour element about two eccentrically disposed axes of rotation.

6. A measuring system according to claim 5, wherein said two axes of rotation of the contour element and a centre axis of at least one of the scanning pins lie on a line.

* * * * *